United States Patent
Chen et al.

(10) Patent No.: US 8,314,183 B2
(45) Date of Patent: Nov. 20, 2012

(54) SILANE COUPLED POLYMERS

(75) Inventors: Yaohong Chen, Akron, OH (US); Yuan-Yong Yan, Copley, OH (US)

(73) Assignee: Bridgestone Corporation, Tokyo (JP)

( * ) Notice: Subject to any disclaimer, the term of this patent is extended or adjusted under 35 U.S.C. 154(b) by 917 days.

(21) Appl. No.: 12/340,850

(22) Filed: Dec. 22, 2008

(65) Prior Publication Data
US 2009/0163675 A1 Jun. 25, 2009

Related U.S. Application Data

(60) Provisional application No. 61/016,462, filed on Dec. 22, 2007.

(51) Int. Cl.
*C08F 8/42* (2006.01)
*C08F 8/30* (2006.01)
*C08F 4/48* (2006.01)

(52) U.S. Cl. .............. 525/102; 525/326.1; 525/332.9; 525/342

(58) Field of Classification Search .............. 525/102, 525/342, 326.1, 332.9
See application file for complete search history.

(56) References Cited

U.S. PATENT DOCUMENTS

| 3,189,576 | A | * | 6/1965 | Edward Sweet ............. 528/35 |
| 4,657,967 | A | | 4/1987 | Klosowski et al. |
| 4,705,877 | A | | 11/1987 | Gornowicz et al. |
| 4,720,530 | A | * | 1/1988 | Wurminghausen et al. .... 528/18 |
| 4,973,623 | A | | 11/1990 | Haugsby et al. |

FOREIGN PATENT DOCUMENTS

| WO | WO 95/33784 | 12/1995 |
| WO | WO 2007/015872 | 2/2007 |

* cited by examiner

*Primary Examiner* — Fred M Teskin
(74) *Attorney, Agent, or Firm* — Meredith E. Hooker; David G. Burleson

(57) ABSTRACT

A functionalized polymer includes a directly bonded moiety, which can be located at a terminus of the polymer, defined by the formula $-[CR^1R^2NH-O-]-Si$ where each $R^1$ and $R^2$ independently is a substituted or unsubstituted hydrocarbyl group and where the Si atom can be bonded through similar moieties to up to three other polymers and/or to the appropriate number of non-interfering groups. The polymer can be provided by introducing a ketoximesilane compound into a system that includes carbanionic (living) polymer. Such polymers can be used in the production of compositions that include particulate fillers.

17 Claims, No Drawings

SILANE COUPLED POLYMERS

CROSS-REFERENCE TO RELATED APPLICATION

This application claims the benefit of U.S. provisional patent application No. 61/016,462, filed 22 Dec. 2007, the entire disclosure of which is incorporated herein by reference.

BACKGROUND INFORMATION

Rubber goods such as tire treads often are made from elastomeric compositions that contain one or more reinforcing materials such as, for example, particulate carbon black and silica; see, e.g., *The Vanderbilt Rubber Handbook*, 13th ed. (1990), pp. 603-04.

Good traction and resistance to abrasion are primary considerations for tire treads; however, motor vehicle fuel efficiency concerns argue for a minimization in their rolling resistance, which correlates with a reduction in hysteresis and heat build-up during operation of the tire. These considerations are, to a great extent, competing and somewhat contradictory: treads made from compositions designed to provide good road traction, particularly in wet conditions, usually exhibit increased rolling resistance and vice versa.

Filler(s), polymer(s), and additives typically are chosen so as to provide an acceptable compromise or balance of these properties. Ensuring that reinforcing filler(s) are well dispersed throughout the elastomeric material(s) both enhances processability and acts to improve physical properties. Dispersion of fillers can be improved by increasing their interaction with the elastomer(s). Examples of efforts of this type include high temperature mixing in the presence of selectively reactive promoters, surface oxidation of compounding materials, surface grafting, and chemically modifying the polymer, typically at a terminus thereof.

For compounds employing silica as a particulate filler, silane coupling agents can increase interactivity between the polymer chains and the silica particles. These types of materials can present some processing difficulties, such as release of ethanol during mixing and/or scorching at high processing temperatures (due to the presence of free sulfur groups in certain types of silanes).

Polymers modified with alkoxysilanes exhibit good interactivity with silica filler, but such compounds can exhibit such high compound Mooney viscosities that they are difficult to process. This tendency can be counteracted by reducing the molecular weight of the polymer, but low molecular weight polymers are difficult to dry and form into bales and also can exhibit cold flow during storage.

Resistance to cold flow is part of another set of competing characteristics: polymers having acceptable cold flow properties often are difficult to process and vice versa. Previous efforts have been directed at blending different types of polymers so as to achieve an acceptable balance of storage and processing performance; see, e.g., U.S. Pat. Nos. 3,278,644, 3,281,389, and 3,242,129.

Elastomers having tin-carbon bonds, often produced through use of tin coupling agents such as $SnCl_4$, typically exhibit good hysteretic performance but marginal wet traction performance. Tin-coupled polymers also exhibit desirable storage characteristics. Examples of relatively recent work in this area can be found in, e.g., U.S. Pat. No. 6,008,295 (combination of tin-coupled and alkoxysilane-terminated polymers) and U.S. Pat. No. 7,279,531 (O-containing coupling agents such as $(Cl_3Sn)_2O$ and $R(Cl_3SnO)_2$ where R is an alkylene group).

SUMMARY

In one aspect is provided a functionalized polymer that includes the reaction product of a terminally reactive polymer and a compound having the general formula

$$J_{4-n}S\text{-}[O\text{---}N\text{=}CR^1R^2]_n \qquad (I)$$

where n is an integer of from 1 to 4 inclusive, in some instances from 1 to 3 inclusive, and each J independently is $R^3$ or a group having the general formula

$$R^3_x Q(CH_2)_m\text{---} \qquad (II)$$

where m is an integer of from 0 to 20 inclusive, Q is a multivalent heteroatom such as, e.g., O, S, N, P, and the like, and x is an integer of from 1 to 3 inclusive as appropriate in view of the particular identity of Q. e.g., x=1 where Q is O or S, $2 \leq x \leq 3$ where Q is P or N (e.g., $-NH_2$ or $-NH_3^+$), etc. In formulas (I) and (II), each $R^1$, $R^2$ and $R^3$ independently is a substituted or unsubstituted hydrocarbyl (e.g., alkyl, alkenyl, cycloalkyl, cycloalkenyl, aryl, allyl, aralkyl, alkaryl, or alkynyl) group.

In another aspect is provided a macromolecule defined by the general formula

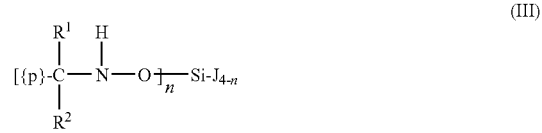

where {p} represents a polymer while each of J, $R^1$, $R^2$, and n are defined as above in connection with formulas (I) and (II).

In yet another aspect is provided a macromolecule that includes the reaction product of two to four carbanionic polymer chains and a ketoximesilane compound; the method involved in this reaction also is provided. In certain embodiments, the ketoximesilane can be defined by formula (I). In these and other embodiments, the macromolecule can be defined by formula (III).

Regardless of how characterized, the polymer can interact with particulate filler such as, e.g., carbon black and silica. Compositions, including vulcanizates, that include particulate fillers and such polymers also are provided, as are methods of providing and using such compositions.

In any or each of these aspects, the polymer can include directly bonded aromatic pendent groups, can be substantially linear, and/or can include unsaturation within and/or pendent from the polymer chain. This unsaturation can result from incorporation of polyene mer units and preferably is substantially random along the polymer chain.

Other aspects of the invention will be apparent to the ordinarily skilled artisan from the description of illustrative embodiments that follows.

To assist in understanding the following description of various embodiments, certain definitions are provided immediately below. These are intended to apply throughout unless the surrounding text explicitly indicates a contrary intention:

"polymer" means the polymerization product of one or more monomers and is inclusive of homo-, co-, ter-, tetra-polymers, etc.;

"macromolecule" means a chemical that includes within its structure two or more polymeric chains;

"mer" or "mer unit" means that portion of a polymer derived from a single reactant molecule (e.g., ethylene mer has the general formula —CH$_2$CH$_2$—);

"copolymer" means a polymer that includes mer units derived from two reactants, typically monomers, and is inclusive of random, block, segmented, graft, etc., copolymers;

"interpolymer" means a polymer that includes mer units derived from at least two reactants, typically monomers, and is inclusive of copolymers, terpolymers, tetrapolymers, and the like;

"carbanionic" and "living" are used interchangeably;

"substituted" means one containing a heteroatom or functionality (e.g., hydrocarbyl group) that does not interfere with the intended purpose of the group in question;

"oxime" means a compound that includes a >C=N—O— group;

"ketoxime" means an oxime in which the C atom is bonded to two other C atoms;

"ketoximesilane" means a ketoxime in which the O atom is bonded to a Si atom;

"directly bonded" means covalently attached with no intervening or interposed atoms or groups;

"polyene" means a molecule with at least two double bonds located in the longest portion or chain thereof, and specifically is inclusive of dienes, trienes, and the like;

"radical" means that portion of a molecule which remains after reacting with another molecule, regardless of whether any atoms are gained or lost as a result of the reaction;

"terminus" means an end of a polymeric chain; and

"terminal moiety" means a group or functionality located at a terminus.

All values herein in the form of percentages are weight percentages unless the surrounding text explicitly indicates a contrary intention. The relevant portion(s) of any specifically referenced patent and/or published patent application are incorporated herein by reference.

DESCRIPTION OF ILLUSTRATIVE EMBODIMENTS

As apparent from the foregoing, the functionalized macromolecular materials (i.e., polymers and macromolecules) can be described in a variety of ways and can be provided by introducing a ketoximesilane compound into a system that includes carbanionic (living) polymer, advantageously one that includes pendent aromatic groups and unsaturation within or pendent from the polymer chain. The type(s) of ketoximesilane compounds employed (as determined by the value of n in the compounds defined by formula (I)) or the molar ratio of ketoximesilane(s) to living polymer chains can be adjusted so as to control the number of chains attached to a ketoximesilane radical.

The polymer can be elastomeric and can include mer units that include unsaturation such as those derived from polyenes, particularly dienes and trienes (e.g., myrcene). Illustrative polyenes include $C_4$-$C_{12}$ dienes, particularly conjugated dienes such as, but not limited to, 1,3-butadiene, isoprene, 1,3-pentadiene, 2,3-dimethyl-1,3-butadiene, and 1,3-hexadiene.

Directly bonded pendent aromatic groups can be provided through incorporation of mer units derived from vinyl aromatics, particularly the $C_8$-$C_{20}$ vinyl aromatics such as, e.g., styrene, α-methyl styrene, p-methyl styrene, the vinyl toluenes, and the vinyl naphthalenes. When used in conjunction with one or more polyenes, mer units with pendent aromaticity can constitute from about 1 to about 50%, from about 10 to about 45%, or from about 20 to about 35%, of the total number of mer units in the polymer chain. The microstructure of such interpolymers can be random, which means that mer derived from each type of constituent monomer generally do not form blocks and, instead, are incorporated in a substantially non-repeating manner. Random microstructure can provide particular benefit in some end use applications such as, e.g., rubber compositions used in the manufacture of tire treads.

Exemplary elastomers include interpolymers of one or more polyenes and styrene such as, e.g., poly(styrene-co-butadiene), also known as SBR.

Polyenes can incorporate into polymeric chains in more than one way. Especially for rubber compositions intended for tire tread applications, controlling this manner of polyene incorporation can be desirable. A polymer chain with an overall 1,2-microstructure, given as a numerical percentage based on total polyene content, of from about 10 to about 80%, or from about 25 to 65%, can be desirable for certain end use applications. Substantially linear polymers are those that have an overall 1,2-microstructure of no more than about 50%, preferably no more than about 45%, more preferably no more than about 40%, even more preferably no more than about 35%, and most preferably no more than about 30%, based on total polyene content.

The number average molecular weight ($M_n$) of the polymer typically is such that a quenched sample exhibits a gum Mooney viscosity ($ML_4/100°$ C.) of from ~2 to ~150, more commonly from ~2.5 to ~125, even more commonly from ~5 to ~100, and most commonly from ~10 to ~75.

These types of polymers can be made by any of a variety of polymerization techniques. Solution polymerization generally affords a higher degree of control with respect to such properties as randomness, microstructure, etc., although other techniques, e.g., emulsion polymerization, also can be utilized. Solution polymerizations have been performed since about the mid-20th century, so the general aspects thereof are known to the ordinarily skilled artisan; nevertheless, certain aspects are provided here for convenience of reference.

Solution polymerizations typically involve an initiator as opposed to, e.g., a catalyst. Exemplary initiators include organolithium compounds, particularly alkyllithium compounds. Examples of organolithium initiators include N-lithio-hexamethyleneimine; n-butyllithium; tributyltin lithium; dialkylaminolithium compounds such as dimethylaminolithium, diethylaminolithium, dipropylaminolithium, dibutylaminolithium and the like; dialkylaminoalkyllithium compounds such as diethylaminopropyllithium; and those trialkylstanyl lithium compounds involving $C_1$-$C_{12}$, preferably $C_1$-$C_4$, alkyl groups.

Multifunctional initiators, i.e., initiators capable of forming polymers with more than one living end, also can be used. Examples of multifunctional initiators include, but are not limited to, 1,4-dilithiobutane, 1,10-dilithiodecane, 1,20-dilithioeicosane, 1,4-dilithiobenzene, 1,4-dilithionaphthalene, 1,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, and 4,4'-dilithiobiphenyl.

In addition to organolithium initiators, so-called functionalized initiators which become incorporated into the polymer chain, thus providing a functional group at the initiated end of the chain, also can be used. Examples of such materials include lithiated aryl thioacetals (see, e.g., U.S. Pat. No. 7,153,919) and the reaction products of organolithium compounds and, for example, N-containing organic compounds such as substituted aldimines, ketimines, secondary amines, etc., optionally pre-reacted with a compound such as diisopropenyl benzene (see, e.g., U.S. Pat. Nos. 5,153,159 and 5,567,815).

Useful anionic polymerization solvents include various $C_5$-$C_{12}$ cyclic and acyclic alkanes as well as their alkylated derivatives, certain liquid aromatic compounds, and mixtures thereof; the ordinarily skilled artisan is aware of other useful solvent options and combinations.

In solution polymerizations, both randomization and vinyl content (i.e., 1,2-microstructure) can be increased by including a coordinator, usually a polar compound, in the polymerization ingredients. Up to 90 or more equivalents of coordinator can be used per equivalent of initiator, with the amount depending on, e.g., the amount of vinyl content desired, the level of non-polyene monomer(s) employed, the reaction temperature, and nature of the specific coordinator employed. Compounds useful as coordinators include organic compounds that include a heteroatom having a non-bonded pair of electrons (e.g., O or N). Examples include dialkyl ethers of mono- and oligo-alkylene glycols; crown ethers; tertiary amines such as tetramethylethylene diamine; THF; THF oligomers; linear and cyclic oligomeric oxolanyl alkanes (see, e.g., U.S. Pat. No. 4,429,091) such as 2,2-bis(2'-tetrahydrofuryl)propane, di-piperidyl ethane, hexamethylphosphoramide, N,N'-dimethylpiperazine, diazabicyclooctane, diethyl ether, tributylamine, and the like.

Although the ordinarily skilled artisan understands the conditions typically employed in solution polymerizations, a representative description is provided for the convenience of the reader. The following is based on a batch process, although extending this description to, e.g., semi-batch or continuous processes is within the capability of the ordinarily skilled artisan.

Solution polymerizations typically begin by charging a blend of monomer(s) and solvent(s) to a suitable reaction vessel, followed by addition of a coordinator (if used) and initiator, which often are added as part of a solution or blend; alternatively, monomer(s) and coordinator can be added to the initiator. The procedure typically is carried out under anhydrous, anaerobic conditions due primarily to the moisture and air sensitivity of most initiators and living polymers made therewith. The reactants can be heated up to about 150° C. and agitated. After a desired degree of conversion has been reached, the heat source (if used) can be removed and, if the reaction vessel is to be reserved solely for polymerizations, the reaction mixture is removed to a post-polymerization vessel for functionalization and/or quenching. At this point, the reaction mixture commonly is referred to as a "polymer cement" because of its relatively high concentration of polymer.

At this point can be provided to the polymer one or more functionalizing moieties that include at least one —Si—O—N< segment, resulting in a macromolecule defined by formula (III). One method of effecting this functionalization involves introducing to the polymer cement one or more ketoximesilane compounds such as, e.g., those defined by formula (I), and allowing such compound(s) to react at the living terminus of the polymer; the carbon atom of one of the oxime group is believed to add to the carbanionic polymer chain.

In compounds defined by formula (I), n can be any of 1 to 4; when n is 1, the result is a polymer with terminal functionality and, when $2 \leq n \leq 4$, the result is a coupled polymer macromolecule.

Additionally, in formula (I), each J independently can be a substituted or unsubstituted hydrocarbyl group, for example, a substituted or unsubstituted alkyl, alkenyl, cycloalkyl, cycloalkenyl, aryl, allyl, aralkyl, alkaryl, or alkynyl group. In certain of these embodiments, at least one J can take the form of an unsubstituted $C_2$-$C_6$, particularly $C_2$-$C_3$, alkyl group or a vinyl group. Other non-limiting examples include arylene groups such as benzylidene; substituted arylene groups such as pyridylmethylidene, nitrobenzylidene, dimethylaminobenzylidene, and the like; cycloalkylene groups such as cyclohexylmethylidene, cyclopentylmethylidene, and the like; and substituted cycloalkylene groups such as tetra-hydrofurylmethylidene. Alternatively, at least one J can be a group defined by formula (II); for example, where Q is O, J can be any of a variety of alkoxy groups including, when m is a non-zero integer, an alkoxy alkyl group.

Specific examples of potentially useful ketoximesilane compounds include, but are not limited to, methyltris(methylethylketoximino)silane, tetrakis(methylethylketoximino)silane, vinylmethylbis(methylethylketoximino)silane, vinyltris(methylethylketoximino)silane, and phenyltris(methylethylketoximino)silane.

Depending on the ratio of ketoximesilane compound(s) to carbanionic polymer chains as well as the number of oxime groups within the ketoximesilane compound(s), a plurality of polymer chains can attach to a single ketoximesilane radical. This ratio generally can range from about 1:2 to as much as 10:1, typically from about 1:1 (often slightly less than 1:1, e.g., 9:10 or 4:5) to 5:1. In this manner, the ketoximesilane radical can act as a coupling agent for the attached polymer chains.

Reaction of ketoximesilane compound(s) with living polymers can be performed relatively quickly (a few minutes to a few hours) at moderate temperatures (e.g., 0° to 75° C.). Substantially linear styrene/diene interpolymers having high amounts (e.g., on the order of 30-40%) of styrene can be difficult to functionalize due to the large number of carbanionic polymer chains with terminal styrene mer units, which tend to be far less reactive than chains having terminal diene mer units. This can be overcome by a staged or sequential charging of additional diene monomer after 70-80% monomer conversion. However, compounds such as those defined by formula (I) advantageously can react readily with living polymers that have relatively high styrene contents without the need for such sequential monomeric addition.

Quenching, if desired, can be conducted by stirring the polymer and an active hydrogen-containing compound, such as an alcohol, water or an acid, for up to about 120 minutes at temperatures of from about 25° to about 150° C.

Solvent can be removed from the (quenched) polymer cement by conventional techniques such as drum drying, extruder drying, vacuum drying or the like, which may be combined with coagulation with water, alcohol or steam; thermal desolventization. If coagulation is performed, oven drying may be desirable.

Polymers and macromolecules such as those described above can display particularly advantageous properties when compounded with, inter alia, reinforcing fillers such as carbon black and silica. They can be utilized in a tread stock compound or can be blended with any conventionally employed tread stock rubber including natural rubber and/or non-functionalized synthetic rubbers such as, e.g., one or more of homo- and interpolymers that include just polyene-derived mer units (e.g., poly(butadiene), poly(isoprene), and copolymers incorporating butadiene, isoprene, and the like), SBR, butyl rubber, neoprene, ethylene/propylene rubber, ethylene/propylene/diene rubber, acrylonitrile/butadiene rubber, silicone rubber, fluoroelastomers, ethylene/acrylic rubber, ethylene/vinyl acetate interpolymer, epichlorohydrin rubbers, chlorinated polyethylene rubbers, chlorosulfonated polyethylene rubbers, hydrogenated nitrile rubber, tetrafluoroethylene/propylene rubber and the like. When a functionalized polymer(s) is blended with conventional rubber(s), the amounts can vary from about 5 to about 99% of the total rubber, with the conventional rubber(s) making up the balance of the total rubber. The minimum amount depends to a significant extent on the degree of hysteresis reduction desired.

Elastomeric compounds typically are filled to a volume fraction, which is the total volume of filler(s) added divided by the total volume of the elastomeric stock, often ~25%; typical (combined) amounts of reinforcing fillers range from about 30 to about 100 parts by weight (pbw) per 100 parts of polymer (phr), with the upper end of the range being defined largely by how effectively processing equipment can handle the increased viscosities imparted when such fillers are employed.

Useful fillers include various forms of carbon black including, but not limited to, furnace black, channel blacks and lamp blacks. More specifically, examples of the carbon blacks include super abrasion furnace blacks, high abrasion furnace blacks, fast extrusion furnace blacks, fine furnace blacks, intermediate super abrasion furnace blacks, semi-reinforcing furnace blacks, medium processing channel blacks, hard processing channel blacks, conducting channel blacks, and acetylene blacks; mixtures of two or more of these can be used. Carbon blacks having a surface area (EMSA) of at least 20 m$^2$/g, preferably at least about 35 m$^2$/g, are preferred; see ASTM D-1765 for methods of determining surface areas of carbon blacks. The carbon blacks may be in pelletized form or an unpelletized flocculent mass, although unpelletized carbon black can be preferred for use in certain mixers.

The amount of carbon black can be up to about 50 phr, with about 5 to about 40 phr being typical.

Amorphous silica (SiO$_2$) also can be utilized as a filler. Silicas are generally classified as wet-process, hydrated silicas because they are produced by a chemical reaction in water, from which they are precipitated as ultrafine, spherical particles. These primary particles strongly associate into aggregates, which in turn combine less strongly into agglomerates. "Highly dispersible silica" is any silica having a very substantial ability to de-agglomerate and to disperse in an elastomeric matrix, which can be observed by thin section microscopy.

Surface area gives a reliable measure of the reinforcing character of different silicas; the Brunauer, Emmet and Teller ("BET") method (described in *J. Am. Chem. Soc.*, vol. 60, p. 309 et seq.) is a recognized method for determining surface area. BET surface areas of silicas generally are less than 450 m$^2$/g, commonly from ~32 to ~400 m$^2$/g or from ~100 to ~250 m$^2$/g or from ~150 to ~220 m$^2$/g.

The pH of the silica filler (when used) is generally from about 5 to about 7 or slightly over, preferably from about 5.5 to about 6.8.

Commercially available silicas include various grades of Hi-Sil™ powdered and granular silicas (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J. M. Huber Corp. (Edison, N.J.).

Silica can be employed in the amount of about 1 to about 100 phr, preferably in an amount from about 5 to about 80 phr.

When used with carbon black, the amount of silica can be decreased to as low as about 1 phr; as the amount of silica decreases, lesser amounts of the processing aids, plus silane if any, can be employed.

When silica is employed, a coupling agent such as a silane often is added so as to ensure good mixing in, and interaction with, the elastomer(s). Generally, the amount of silane that is added ranges between about 4 and 20%, based on the weight of silica filler present in the elastomeric compound.

Coupling agents can have a general formula of A-T-G, in which A represents a functional group capable of bonding physically and/or chemically with a group on the surface of the silica filler (e.g., surface silanol groups); T represents a hydrocarbon group linkage; and G represents a functional group capable of bonding with the elastomer (e.g., via a sulfur-containing linkage). Such coupling agents include organosilanes, in particular polysulfurized alkoxysilanes (see, e.g., U.S. Pat. Nos. 3,873,489, 3,978,103, 3,997,581, 4,002,594, 5,580,919, 5,583,245, 5,663,396, 5,684,171, 5,684,172, 5,696,197, etc.) or polyorganosiloxanes bearing the G and A functionalities mentioned above. An exemplary coupling agent is bis[3-(triethoxysilyl)propyl]tetrasulfide.

Addition of a processing aid can be used to reduce the amount of silane employed. See, e.g., U.S. Pat. No. 6,525,118 for a description of fatty acid esters of sugars used as processing aids. Additional fillers useful as processing aids include, but are not limited to, mineral fillers, such as clay (hydrous aluminum silicate), talc (hydrous magnesium silicate), and mica as well as non-mineral fillers such as urea and sodium sulfate. Exemplary micas contain principally alumina, silica and potash, although other variants can be used. Additional fillers can be utilized in an amount of up to about 40 phr, typically up to about 20 phr.

Other conventional rubber additives also can be added. These include, for example, process oils, plasticizers, anti-degradants such as antioxidants and antiozonants, curing agents and the like.

All ingredients can be mixed with standard equipment such as, e.g., Banbury or Brabender mixers. Typically, mixing occurs in two or more stages. During the first stage (often referred to as the masterbatch stage), mixing typically is begun at temperatures of ~120° to ~130° C. and increases until a so-called drop temperature, typically ~165° C., is reached.

Where a formulation includes silica, a separate re-mill stage often is employed for separate addition of the silane component(s). This stage often is performed at temperatures similar to, although often slightly lower than, those employed in the masterbatch stage, i.e., ramping from ~90° C. to a drop temperature of ~150° C.

Reinforced rubber compounds conventionally are cured with about 0.2 to about 5 phr of one or more known vulcanizing agents such as, for example, sulfur or peroxide-based curing systems. For a general disclosure of suitable vulcanizing agents, the interested reader is directed to an overview such as that provided in Kirk-Othmer, *Encyclopedia of Chem. Tech.*, 3d ed., (Wiley Interscience, New York, 1982), vol. 20, pp. 365-468. Vulcanizing agents, accelerators, etc., are added at a final mixing stage. To reduce the chances of undesirable scorching and/or premature onset of vulcanization, this mixing step often is done at lower temperatures, e.g., starting at ~60° to ~65° C. and not going higher than ~105° to ~110° C.

Subsequently, the compounded mixture is processed (e.g., milled) into sheets prior to being formed into any of a variety of components and then vulcanized, which typically occurs at ~5° to ~15° C. higher than the highest temperatures employed during the mixing stages, most commonly about 170° C.

The following non-limiting, illustrative examples provide the reader with detailed conditions and materials that can be useful in the practice of the present invention.

EXAMPLES

In the examples, dried glass vessels previously sealed with extracted septum liners and perforated crown caps under a positive $N_2$ purge were used for all preparations. Butadiene (22.2% in hexane), styrene (33% in hexane), hexane, n-butyllithium (1.60 M in hexane), 2,2-bis(2'-tetrahydrofuryl)propane solution (1.6 M solution in hexane, stored over $CaH_2$), and butylated hydroxytoluene (BHT) solution in hexane were used.

Commercially available reagents and starting materials included the following (with as-purchased purities given in parentheses), all of which were acquired from Sigma-Aldrich Co. (St. Louis, Mo.) and used without further purification unless otherwise noted in a specific example: tetraethyl orthosilicate (99%), $SnCl_4$ (99%), and $SiCl_4$. Methyltris-(methylethylketoximino)silane (95% purity) and tetrakis(methylethylketoximino)silane were acquired from Gelest Inc. (Morrisville, Pa.) and dried over molecular sieves (0.3 nm).

Testing data in the Examples was performed on vulcanizates, which were cured for ~15 minutes at 171° C. The compounds from which these vulcanizates were prepared were made according to the formulations shown below in Tables 1a (carbon black) and 1b (silica) where N-phenyl-N'-(1,3-dimethylbutyl)-p-phenylenediamine (6PPD) acts as an antioxidant and 2,2'-dithiobis(benzothiazole) (MBTS), N-tert-butylbenzothiazole-2-sulfenamide (TBBS) and N,N'-diphenylguanidine (DPG) act as accelerators. Black oil is an extender oil that contains a relatively low amount of polycyclic aromatic (PCA) compounds.

TABLE 1a

| Compound formulation, carbon black as filler | |
|---|---|
| | Amount (phr) |
| Masterbatch | |
| synthetic polymer | 100 |
| carbon black (N343 type) | 50 |
| wax | 2 |
| 6PPD | 0.95 |
| stearic acid | 2 |
| black oil | 10 |
| Final | |
| sulfur | 1.5 |
| ZnO | 2.5 |
| MBTS | 0.5 |
| TBBS | 0.5 |
| DPG | 0.3 |
| TOTAL | 170.25 |

TABLE 1b

| Compound formulation, silica as filler | |
|---|---|
| | Amount (phr) |
| Masterbatch | |
| synthetic polymer | 80 |
| natural rubber | 20 |
| silica | 52.5 |
| wax | 2 |

TABLE 1b-continued

| Compound formulation, silica as filler | |
|---|---|
| | Amount (phr) |
| 6PPD | 0.95 |
| stearic acid | 2 |
| black oil | 10 |
| Re-mill | |
| 60% disulfide silane on carrier | 5 |
| silica | 2.5 |
| Final | |
| sulfur | 1.5 |
| ZnO | 2.5 |
| MBTS | 2 |
| TBBS | 0.7 |
| DPG | 1.4 |
| TOTAL | 183.05 |

Data corresponding to "Dynastat tan δ" were acquired from tests conducted on a Dynastat™ mechanical spectrometer (Dynastatics Instruments Corp.; Albany, N.Y.) using the following conditions: 1 Hz, 2 kg static mass and 1.25 kg dynamic load, a cylindrical (9.5 mm diameter×16 mm height) vulcanized rubber sample, and the indicated temperature.

Examples 1-6

To a reactor equipped with turbine agitator blades were added 3.03 kg hexane, 1.20 kg styrene solution, and 7.06 kg butadiene solution. The reactor was charged with 8.27 mL n-butyllithium, followed by 4.07 mL of 2,2-bis(2'-tetrahydrofuryl)propane solution. The batch temperature was controlled at ~49° C. After about an hour, the reaction mixture was cooled to ~32° C.

Portions of the polymer cement (~400 g each) were transferred from the reactor to sealed, $N_2$-purged 800 mL glass vessels. One sample was terminated with isopropanol, coagulated in isopropanol containing BHT and drum dried. This polymer had a $M_n$ of 132 kg/mol, a molecular weight distribution of 1.03, and a glass transition temperature of −32.0° C. The styrene content of the polymer was ~22%, and its 1,2-microstructure (i.e., vinyl content) was ~55% (relative to total butadiene content).

The remaining samples were reacted (50° C. bath, rotated for ~60 minutes) with, respectively, 1:5 tetrakis(methylethylketoximino)silane (sample 2), 3:10 methyltris(methylethylketoximino)silane (sample 3), 1:5 tetraethyl orthosilicate (sample 4), 1:5 $SiCl_4$ (sample 5), and 1:5 $SnCl_4$ (sample 6).

(The ratio is equivalents of reactant to equivalents of polymer chains, calculated from the amount of initiator employed.) These and the non-functionalized control (sample 1) were coagulated in isopropanol containing BHT and drum dried.

Properties of the coupled polymers and results of physical testing on these compounds are shown below in Table 2. For those rows that include two data points, the upper is for a formulation from Table 1a, and the lower is for a formulation from Table 1b.

TABLE 2

Testing data from Examples 2-6

|  | 2 | 3 | 4 | 5 | 6 |
|---|---|---|---|---|---|
| $M_p$ (kg/mol) | 288 | 282 | 398 | 450 | 454 |
| % coupling | 35 | 51 | 70 | 87 | 80 |
| $ML_{1+4}$ @ 100° C., polymer only | 59.2 | 60.5 | 84.7 | 99.6 | 100 |
| $ML_{1+4}$ @ 130° C., carbon black compound | 51.9 | 58.9 | 69.5 | 84.0 | 56.9 |
| $ML_{1+4}$ @ 130° C., Si compound | 41.8 | 43.5 | 60.3 | 78.0 | 53.7 |
| Dynastat tan δ, 0° C. | 0.517 | 0.538 | 0.503 | 0.497 | 0.538 |
|  | 0.364 | 0.413 | 0.354 | 0.333 | 0.364 |
| Dynastat tan δ, 30° C. | 0.196 | 0.197 | 0.211 | 0.212 | 0.173 |
|  | 0.136 | 0.130 | 0.136 | 0.127 | 0.137 |
| Dynastat tan δ, 60° C. | 0.145 | 0.143 | 0.158 | 0.155 | 0.123 |
|  | 0.0952 | 0.0885 | 0.0942 | 0.0871 | 0.0974 |

From the data of Table 2, one can see that compounds made with styrene/butadiene interpolymers having terminal functionalization provided through reaction with ketoximesilane compounds (Examples 2 and 3) can exhibit good hysteretic properties (as indicated by low tan δ at 60° C.) and good wet traction properties (as indicated by high tan δ at 0° C.), particularly with respect to silica-based compounds. Such compounds also display satisfactory compound Mooney viscosities.

Examples 7-12

To a reactor equipped with turbine agitator blades was added 4.5 kg hexane, 1.8 kg styrene solution, and 5.0 kg butadiene solution. The reactor was charged with 7.1 mL n-butyllithium, followed by 0.79 mL potassium t-amylate and 0.43 mL of 2,2-bis(2'-tetrahydrofuryl)propane solution. The batch temperature was controlled at ~82° C. After about an hour, the reaction mixture was cooled to ~32° C.

Portions of the polymer cement (~400 g each) were transferred from the reactor to sealed, $N_2$-purged 800 mL glass vessels. One sample was terminated with isopropanol, coagulated in isopropanol containing BHT and drum dried. This polymer had a $M_n$ of 145 kg/mol, a molecular weight distribution of 1.06, and a glass transition temperature of −44° C. The styrene content of the polymer was ~38%, and its 1,2-microstructure (i.e., vinyl content) was ~22% (relative to total butadiene content).

The remaining samples were terminated (50° C. bath, rotated for 60 minutes) with, respectively, 9:10 O-(trimethylsilyl)oxime-2-butanone (sample 7)
9:10 tetrakis(methylethylketoximino)silane (sample 8),
9:10 methyltris(methylethylketoximino)silane (sample 9),
9:10 tetraethyl orthosilicate (sample 10),
9:10 $SiCl_4$ (sample 11), and
9:10 $SnCl_4$ (sample 12).

(The ratio is the same as that described in connection with Examples 1-6.) These and the non-functionalized control were coagulated in isopropanol containing BHT and drum dried.

Properties of the coupled polymers and results of physical testing on these compounds are shown below in Table 3. For those rows that include two data points, the upper is for a formulation from Table 1a, and the lower is for a formulation from Table 1b.

TABLE 3

Testing data from Examples 7-12

|  | 7 | 8 | 9 | 10 | 11 | 12 |
|---|---|---|---|---|---|---|
| $M_p$ (kg/mol) | 155 | 314 | 314 | 319 | 323 | 308 |
| % coupling | 0 | 43 | 27 | 40 | 52 | 20 |
| $ML_{1+4}$ @ 100° C., polymer only | 41.9 | 95.6 | 95.3 | 175.9 | 142.5 | 91.8 |
| $ML_{1+4}$ @ 130° C., carbon black compound | 50.1 | 78.5 | 73.3 | 118.6 | 120.1 | 67.7 |
| $ML_{1+4}$ @ 130° C., Si compound | 38.4 | 61.6 | 57.9 | 78.3 | 87.8 | 56.3 |
| Dynastat tan δ, 0° C. | 0.403 | 0.446 | 0.433 | 0.397 | 0.433 | 0.477 |
|  | 0.270 | 0.366 | 0.323 | 0.349 | 0.367 | 0.298 |
| Dynastat tan δ, 30° C. | 0.234 | 0.215 | 0.213 | 0.211 | 0.216 | 0.187 |
|  | 0.148 | 0.145 | 0.147 | 0.140 | 0.143 | 0.150 |
| Dynastat tan δ, 60° C. | 0.193 | 0.166 | 0.166 | 0.170 | 0.165 | 0.137 |
|  | 0.115 | 0.098 | 0.102 | 0.094 | 0.095 | 0.111 |

From the data of Table 3, one can see that compounds made with styrene/butadiene interpolymers having a high styrene mer content and terminal functionalization provided through reaction with ketoximesilane compounds (Examples 8 and 9) can exhibit good hysteretic properties (as indicated by low tan δ at 60° C.) and good wet traction properties (as indicated by high tan δ at 0° C.), particularly with respect to silica-based compounds. Such compounds also display satisfactory compound Mooney viscosities.

That which is claimed is:

1. A macromolecule comprising at least one polymer chain and a silicon atom-containing group, said macromolecule being defined by the general formula

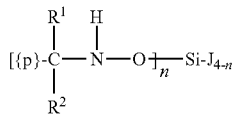

where
{p} represents a polymer chain;
n is an integer of from 1 to 4 inclusive;
each $R^1$ and $R^2$ independently is a substituted or unsubstituted hydrocarbyl group; and
each J independently is $R^3$ or a group having the general formula $R^3{}_xQ(CH_2)_m$— in which m is an integer of from 0 to 20 inclusive, Q is a multivalent heteroatom, x is an integer of from 1 to 3 inclusive as appropriate in view of the particular identity of Q, and each $R^3$ independently is a substituted or unsubstituted hydrocarbyl group.

2. The macromolecule of claim 1 wherein n is 1.

3. The macromolecule of claim 2 wherein at least one J is $R^3$.

4. The macromolecule of claim 2 wherein each J is $R^3$.

5. The macromolecule of claim 2 wherein each $R^1$ and $R^2$ independently is an alkyl group.

6. The macromolecule of claim 1 wherein each $R^1$ and $R^2$ independently is an alkyl group.

7. The macromolecule of claim 1 wherein n is 2.

8. The macromolecule of claim 7 wherein each $R^1$ and $R^2$ independently is an alkyl group.

9. The macromolecule of claim 1 wherein n is 3.

10. The macromolecule of claim 9 wherein each $R^1$ and $R^2$ independently is an alkyl group.

11. The macromolecule of claim 1 wherein n is 4.

12. The macromolecule of claim 11 wherein each $R^1$ and $R^2$ independently is an alkyl group.

13. The macromolecule of claim 1 wherein n is less than 4, at least one J is $R^3{}_xQ(CH_2)_m$— is an oxygen atom, and x is 1.

14. The macromolecule of claim 1 wherein said macromolecule comprises the reaction product of from one to four carbanionic polymer chains and a ketoximesilane compound.

15. The macromolecule of claim 14 wherein said ketoximesilane compound has the general formula

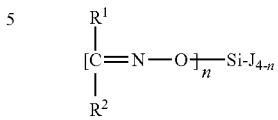

where
n is an integer of from 1 to 4 inclusive,
each $R^1$ and $R^2$ independently is a substituted or unsubstituted hydrocarbyl group, and
each J independently is $R^3$ or a group having the general formula $R^3{}_xQ(CH_2)_m$— in which m is an integer of from 0 to 20 inclusive, Q is a multivalent heteroatom, x is an integer of from 1 to 3 inclusive as appropriate in view of the particular identity of Q, and each $R^3$ independently is a substituted or unsubstituted hydrocarbyl group.

16. The macromolecule of claim 14 wherein said macromolecule comprises the reaction product of from two to four carbanionic polymer chains and a ketoximesilane compound.

17. The macromolecule of claim 16 wherein said ketoximesilane compound has the general formula

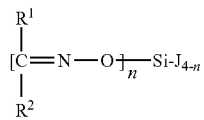

where
n is an integer of from 1 to 4 inclusive,
each $R^1$ and $R^2$ independently is a substituted or unsubstituted hydrocarbyl group, and
each J independently is $R^3$ or a group having the general formula $R^3{}_xQ(CH_2)_m$— in which m is an integer of from 0 to 20 inclusive, Q is a multivalent heteroatom, x is an integer of from 1 to 3 inclusive as appropriate in view of the particular identity of Q, and each $R^3$ independently is a substituted or unsubstituted hydrocarbyl group.

* * * * *

UNITED STATES PATENT AND TRADEMARK OFFICE
CERTIFICATE OF CORRECTION

PATENT NO. : 8,314,183 B2  Page 1 of 1
APPLICATION NO. : 12/340850
DATED : November 20, 2012
INVENTOR(S) : Chen et al.

It is certified that error appears in the above-identified patent and that said Letters Patent is hereby corrected as shown below:

In column 13, line 41, delete "$R^3_xQ(CH_2)_m-$ is" and insert -- $R^3_xQ(CH_2)_m-$, Q is --.

Signed and Sealed this
Twenty-sixth Day of March, 2013

Teresa Stanek Rea
*Acting Director of the United States Patent and Trademark Office*